United States Patent [19]

Clark

[11] 4,217,925
[45] Aug. 19, 1980

[54] GASOLINE LINE LOCK

[76] Inventor: Bob Clark, 9156 Rose St., Bellflower, Calif. 90706

[21] Appl. No.: 944,753

[22] Filed: Sep. 22, 1978

[51] Int. Cl.² ............... B60R 25/04; E05B 65/12; F16K 5/00; F16K 35/00
[52] U.S. Cl. ............................ 137/385; 70/242; 251/309; 251/312; 137/354
[58] Field of Search ............ 70/242; 137/385, 625.47; 251/309, 312, 310, 311

[56] References Cited

U.S. PATENT DOCUMENTS

| | | | |
|---|---|---|---|
| 1,217,406 | 2/1917 | Burkhardt | 70/242 X |
| 2,881,789 | 4/1959 | Finazzo | 70/242 X |
| 3,165,122 | 1/1965 | Sachnik | 251/312 X |
| 3,360,236 | 12/1967 | Hulslander | 251/312 X |
| 3,783,900 | 1/1974 | Waldbillig | 251/309 X |
| 3,788,355 | 1/1974 | Wood | 137/625.47 X |
| 3,788,602 | 1/1974 | Kitzie | 251/312 |
| 3,806,087 | 4/1974 | Hulslander | 251/309 |
| 4,051,866 | 10/1977 | Bake et al. | 251/309 X |
| 4,146,055 | 3/1979 | Ryder et al. | 251/312 X |
| 4,147,184 | 4/1979 | Jess | 251/312 X |

FOREIGN PATENT DOCUMENTS

| | | | |
|---|---|---|---|
| 548929 | 4/1932 | Fed. Rep. of Germany | 251/309 |
| 860880 | 12/1952 | Fed. Rep. of Germany | 251/312 |
| 360541 | 11/1931 | United Kingdom | 70/242 |
| 417859 | 10/1934 | United Kingdom | 70/242 |

*Primary Examiner*—Roy D. Frazier
*Assistant Examiner*—Carl F. Pietruszka
*Attorney, Agent, or Firm*—William C. Babcock

[57] ABSTRACT

Disclosed herein is a locking mechanism for closing the gas line in an automobile, said locking mechanism comprising a tumbler lock engaged to a rotary valve adapted for insertion into a fuel line. The valve itself comprises a rectangular body having a transverse circular opening formed therein across which the fuel flow communicates. Installed in the transverse opening is a rotary planar vane being rotatable to a first position uncovering the inlet and outlet ports of the circular opening and conformed on its exterior edges to the opening periphery, said vane having stand-offs on the bottom thereof for providing a communicating path for the gasoline and being rotatable to a second position closing off the communicating path. In the last position the thickness of the vane blocks the passage of gasoline thus precluding unauthorized use of the automobile. It is contemplated that the foregoing lock be installed in the floor surface of the automobile, the valve extending therefrom being placed into the fuel line.

4 Claims, 6 Drawing Figures

U.S. Patent  Aug. 19, 1980  4,217,925
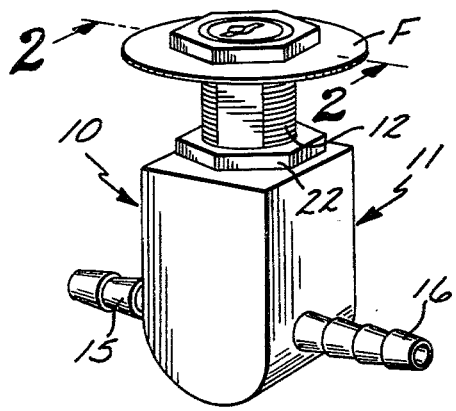
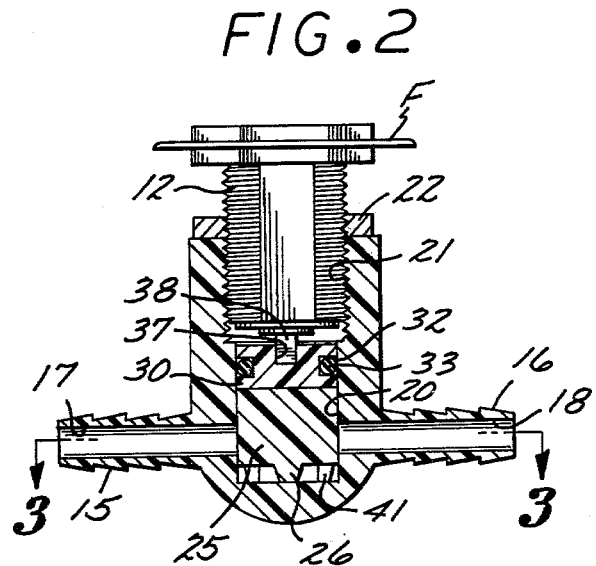
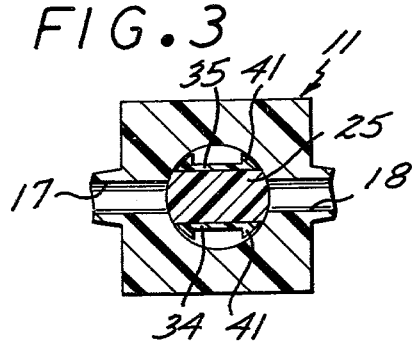
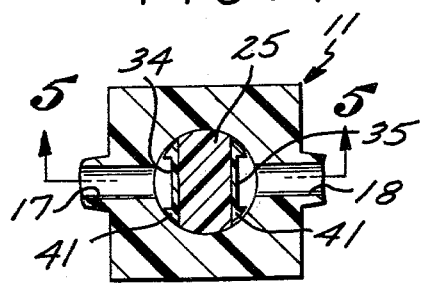
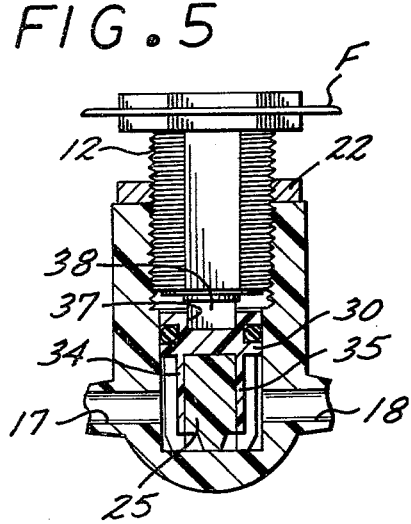
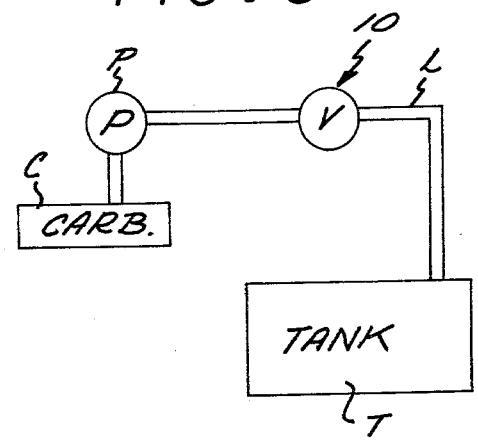

GASOLINE LINE LOCK

BACKGROUND OF THE INVENTION

1. Field of the Invention

The present invention relates to valve mechanisms, and more particularly to a locking valve useful with automotive gasoline systems.

2. Description of the Prior Art

With the increase in automobile theft presently experienced, various devices have been put forth in the market for rendering the automobile inoperative. Most frequently the electrical connections entailed in the operation of the automobile are interrupted with hidden locks and/or hidden switches. The foregoing systems, however, are easily avoided or bypassed by those knowledgeable in the field, particularly by direct connection to the battery in order to get the vehicle moving. For this reason there have developed in the past various locking mechanisms which both open the ignition circuit and lock the steering mechanism thus rendering the automobile inoperative. Again, those knowledgeable in the field and inclined to steal automobiles have found ways of disabling this locking mechanism and further securing features are now being put forth in the market to augment those locks put in by the manufacturer. One way of rendering an automobile inoperative is to cut off the fuel supply thereof. Once more, the features of a lock in the fuel line must be such as to preclude pampering.

SUMMARY OF THE INVENTION

Accordingly it is the general purpose and object of the present invention to provide a locking valve mechanism adapted for insertion into the gasoline line of an automobile.

Further objects of the invention are to provide a locking valve for the gas line of an automobile wherein the valve structure is separated from the lock.

Yet additional objects of the invention are to provide a locking mechanism for use with the gasoline fuel line which may be installed into the floor surfaces thereof.

Briefly these and other objects are accomplished within the present invention by providing a locking valve assembly having a substantially rectangular valve housing provided with two opposed male fittings on the lateral surfaces thereof, the fittings communicating with a transverse interior bore extending partly through the housing. Received in the bore, and supported by a vertical stand off from the bottom thereof, is a vane-like structure formed as a rectangular element having two lateral edges shaped to fit the bore, the thickness of the vane being substantially equal or greater than the transverse opening communicating with the exteriorly directed male fitting. Thus in one position the vane will lock the transverse opening, thus precluding flow thereacross. When rotated to expose the openings, the flow is passed underneath the vane, around the stand off, to the other opening thus providing for flow continuity. The foregoing vane is retained on the interior of a forked fitting, again conformed around the periphery thereof to the shape of the bore, the forked fitting including a peripheral O-ring groove provided in an O-ring to effect a seal. Formed on the upper surface of the fork fitting is a key slot into which a key member from a lock assembly is received. The lock assembly, in turn, is threadably inserted into the upper end of the bore being secured thereat by the necessary clamping nuts. The face of the lock assembly may then be installed into the floor board of an automobile, to be covered by rug sections, disabling the automobile when articulated.

It is to be understood that the foregoing valve assembly installed into the gas line between the gas tank and the gasoline pump, and while the automobile will be operative by virtue of the fuel collected in carburetor bowl, operation for a short term only will be possible. Thus, any unauthorized use will result in the embarassing and exposed shut-down after the automobile is moved, the securing device providing no prior indication of its presence.

BRIEF DESCRIPTION OF THE DRAWING

FIG. 1 is a perspective illustration of a gasoline locking device constructed according to the present invention;

FIG. 2 is a side view, in section, taken along line 2—2 of FIG. 1;

FIG. 3 is a top sectional view taken on line 3—3 of FIG. 2 and illustrating the alignment of the locking device in a closed position;

FIG. 4 is yet another top view identical to that shown in FIG. 3 except for the alignment of the locking device to an operating condition;

FIG. 5 is yet another side view in section taken along line 5—5 of FIG. 4; and

FIG. 6 is a schematic diagram illustrating the deployment of the locking device in the gasoline line of an automobile.

DESCRIPTION OF THE PREFERRED EMBODIMENT

As shown in FIGS. 1–5, the inventive locking device, generally designated by the numeral 10, comprises a rectangular housing 11 provided with a lock tumbler assembly 12 threaddably inserted into the upper surface thereof. Included further in the housing 11 and extending from the lateral opposed surfaces thereof are two male fittings 15 and 16 aligned along a common axis, each fitting including axially aligned bores respectively shown as bores 17 and 18. Bores 17 and 18 communicate with a vertically aligned central bore 20 formed on the interior of housing 11, bore 20 extending through a threaded section 21 to the exterior of the housing. It is within this threaded section 21 that the tumbler assembly is retained, a nut 22 locking the tumbler 12 in position. Deployed on the interior of bore 20 is a planar, substantially rectangular vane 25 of a thickness greater than the diameter of bores 17 and 18, vane 25 including two opposed vertical edges conformed as cylindrical sections mated with the interior surface of bore 20. Thus when aligned along the axis of bores 17 and 18 vane 25 will block flow thereacross cutting off the gas supply. Vane 25 is supported at the bottom end thereof by a circular stand off 26 and when rotated out of alignment with the male fitting a path is formed across bores 17 and 18 and underneath the vane. This alignment of the vane either in or out of locking position is made by way of a forked fitting 30 having an upper circular flange 31 formed therein, flange 31 including an O-ring groove 32 into which an O-ring 33 is seated. The dimensions of the flange 30, O-ring 33 and ring groove 32 are conformed to the interior dimensions of bore 20 to provide a sealing fit. In this manner gas flow upwardly through bore 20 is precluded while two forked extensions directed from flange 31 and shown herein as extensions 34 and 35 engage the aforementioned vane 25. These same forked extensions 34 and 35 each include edge leads 41 which extend downwardly along the edges thereof, a dimension equal to the standoff 26.

Thus a fingerlike structure supported at the bottom surface of bore 20 engages the vane 25 which is similarly supported by the standoff 26. This fingerlike structure is in turn extending from the aforementioned disc or flange 31 which on the upper surface thereof is provided with a key slot 37 engaging a turning key 38 on the bottom end of the tumbler assembly 12. Thus the tumbler assembly, when fitted into the floor F of an automobile, will project downwardly therefrom supporting the valve housing 11. It is to be understood that the disposition of the tumbler assembly in the automobile floor is made such that direct gas line connection can be completed across the male fittings 15 and 16. When so installed the articulation of vane 25 into the in-line position as shown in FIG. 3, will preclude fuel flow thereacross. More specifically as shown in FIG. 6 the installation of the foregoing lock assembly 10 is thus in the fuel line L extending from the gas tank T to the gasoline pump P. As the flow is cut off by the manipulation of the tumbler assembly 12 the input to pump P is blocked. Thus the only fuel available to drive the automobile is that stored in the bowl of carburetor C and possibly some residual drainage out of the cavity in the pump and the line proximate thereto. The automobile will therefore start giving the person using it the impression that full operation has been achieved. It is only when the fuel is drained out of the bowl of the carburetor C that first notice of a possible blockage is made. Thus the thief is exposed to the surprising shut down at an unanticipated point in his departure which often will occur in an exposed area where further search for any locking devices is not practical.

Obviously many modifications and changes may be made to the foregoing description without departing from the spirit of the invention. It is therefore intended that the scope of the claims be determined solely on the claims appended hereto.

What is claimed is:

1. A lock articulated valve adapted for installation into the gasoline line of an automobile, comprising:

a valve housing having a first bore extending partly into the interior thereof and second and third bores axially aligned relative each other and communicating from opposed directions with said first bore along an axis normal thereto;

a planar vane received in said first bore and adapted for rotation therein, said planar vane being of a thickness greater than the width of said second and third bores and including a stand-off on the bottom edge thereof opposed against the bottom surface of said first bore;

a circular sealing assembly deployed over said vane within said first bore and including downwardly directed projections adapted to engage said vane; and locking means inserted in said valve housing for articulating said vane and said sealing assembly.

2. Apparatus according to claim 1 wherein:

said sealing assembly includes a peripheral O-ring conformed for sealing contact with said first bore.

3. Apparatus according to claim 2 wherein:

said locking means is adapted for installation into the floor of said automobile.

4. Apparatus according to claim 3 wherein:

said housing includes male projections surrounding said second and third bores and adapted for insertion into said gasoline line.

* * * * *